(12) United States Patent
Lee

(10) Patent No.: US 7,827,347 B2
(45) Date of Patent: Nov. 2, 2010

(54) MEMORY SYSTEM, MULTI-BIT FLASH MEMORY DEVICE, AND ASSOCIATED METHODS

(75) Inventor: Seung-Jae Lee, Hwaseong-si (KR)

(73) Assignee: Samsung Electronics Co., Suwon-si, Gyeonggi-do (KR)

( * ) Notice: Subject to any disclaimer, the term of this patent is extended or adjusted under 35 U.S.C. 154(b) by 478 days.

(21) Appl. No.: 12/007,216

(22) Filed: Jan. 8, 2008

(65) Prior Publication Data

US 2008/0168216 A1 Jul. 10, 2008

(30) Foreign Application Priority Data

Jan. 9, 2007 (KR) .................... 10-2007-0002598

(51) Int. Cl.
*G06F 12/00* (2006.01)
(52) U.S. Cl. .................................. 711/103; 365/185.03
(58) Field of Classification Search .................. 711/103; 365/185, 230
See application file for complete search history.

(56) References Cited

U.S. PATENT DOCUMENTS

| | | | |
|---|---|---|---|
| 6,442,076 B1 | 8/2002 | Roohparvar | |
| 6,606,269 B2 | 8/2003 | Roohparvar | |
| 7,102,927 B2 | 9/2006 | Jo | |
| 7,193,897 B2 | 3/2007 | Lee | |
| 7,242,632 B2 | 7/2007 | Hiraka | |
| 2008/0168214 A1* | 7/2008 | Kwon et al. ................. | 711/103 |
| 2008/0256287 A1* | 10/2008 | Lee et al. ..................... | 711/103 |
| 2008/0313387 A1* | 12/2008 | Shibata ........................ | 711/103 |
| 2009/0172256 A1* | 7/2009 | Chu et al. .................... | 711/103 |
| 2009/0172266 A1* | 7/2009 | Kimura ....................... | 711/103 |
| 2009/0193184 A1* | 7/2009 | Yu et al. ...................... | 711/103 |
| 2009/0240873 A1* | 9/2009 | Yu et al. ...................... | 711/103 |
| 2009/0319721 A1* | 12/2009 | Lin .............................. | 711/103 |
| 2010/0042772 A1* | 2/2010 | Bonella et al. .............. | 711/103 |
| 2010/0082878 A1* | 4/2010 | Inoue et al. ................. | 711/103 |

FOREIGN PATENT DOCUMENTS

| | | |
|---|---|---|
| JP | 10-011984 | 1/1998 |
| JP | 2004-078907 A | 3/2004 |
| KR | 10-2005-0108986 A | 11/2005 |
| KR | 10-2005-0007629 A | 1/2006 |
| KR | 10-2006-0075361 A | 7/2006 |

\* cited by examiner

*Primary Examiner*—Jack A Lane
(74) *Attorney, Agent, or Firm*—Lee & Morse, P.C.

(57) ABSTRACT

A memory system includes a multi-bit flash memory device and a flash controller configured to control the multi-bit flash memory device. The flash controller is configured to output a series of commands, pointers, and addresses to the multi-bit flash memory device for read/program operations.

24 Claims, 7 Drawing Sheets

Fig. 3B 3-bit/Cell
Block=192 Pages

| | | Ai | | A21 | A20 | A19 | A18 | A17 | A16 | A15 | A14 | A13 | A12 | |
|---|---|---|---|---|---|---|---|---|---|---|---|---|---|---|
| BLK0 | 0P | 0 | ... | 0 | 0 | 0 | 0 | 0 | 0 | 0 | 0 | 0 | 0 | ← 1st page |
| | 1P | 0 | ... | 0 | 0 | 0 | 0 | 0 | 0 | 0 | 0 | 0 | 1 | |
| | ⋮ | 0 | ... | ⋮ | ⋮ | ⋮ | ⋮ | ⋮ | ⋮ | ⋮ | ⋮ | ⋮ | ⋮ | |
| | 190P | 0 | ... | 0 | 0 | 1 | 0 | 1 | 1 | 1 | 1 | 1 | 0 | |
| | 191P | 0 | ... | 0 | 0 | 1 | 0 | 1 | 1 | 1 | 1 | 1 | 1 | ← Last page |
| BLK1 | 192P | 0 | ... | 0 | 0 | 1 | 1 | 0 | 0 | 0 | 0 | 0 | 0 | ← 1st page |
| | 193P | 0 | ... | 0 | 0 | 1 | 1 | 0 | 0 | 0 | 0 | 0 | 1 | |
| | ⋮ | 0 | ... | ⋮ | ⋮ | ⋮ | ⋮ | ⋮ | ⋮ | ⋮ | ⋮ | ⋮ | ⋮ | |
| | 382P | 0 | ... | 0 | 1 | 0 | 1 | 1 | 1 | 1 | 1 | 1 | 0 | |
| | 383P | 0 | ... | 0 | 1 | 0 | 1 | 1 | 1 | 1 | 1 | 1 | 1 | ← Last page |
| BLK2 | 384P | 0 | ... | 0 | 1 | 1 | 0 | 0 | 0 | 0 | 0 | 0 | 0 | ← 1st page |
| | 385P | 0 | ... | 0 | 1 | 1 | 0 | 0 | 0 | 0 | 0 | 0 | 1 | |
| | ⋮ | 0 | ... | ⋮ | ⋮ | ⋮ | ⋮ | ⋮ | ⋮ | ⋮ | ⋮ | ⋮ | ⋮ | |
| | 574P | 0 | ... | 1 | 0 | 0 | 0 | 1 | 1 | 1 | 1 | 1 | 1 | |
| | 575P | 0 | ... | 1 | 0 | 0 | 1 | 0 | 0 | 0 | 0 | 0 | 0 | ← Last page |

⋮ ⋮

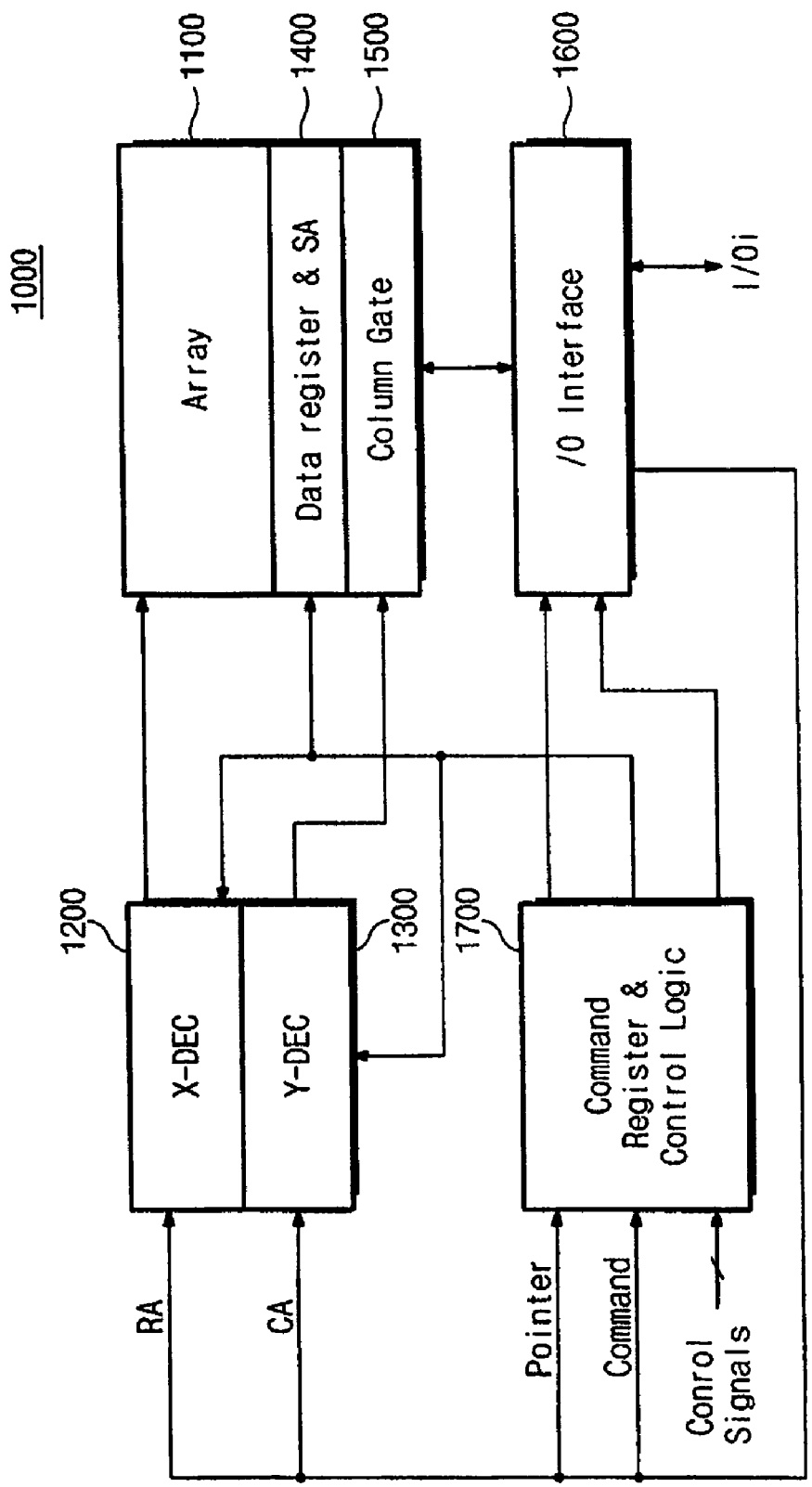

MEMORY SYSTEM, MULTI-BIT FLASH MEMORY DEVICE, AND ASSOCIATED METHODS

BACKGROUND OF THE INVENTION

1. Field of the Invention

Embodiments relate to a semiconductor memory device. More particularly, embodiments relate to a flash memory device storing multi-bit data and associated methods.

2. Description of the Related Art

A flash memory device is a type of an electrically erasable programmable read-only memory (EEPROM) in which a plurality of memory regions, i.e., a memory block, are erased or programmed by one program operation. The simultaneous operations allow the flash memory device to operate effectively at high speed.

The flash memory device is a non-volatile memory device, i.e., does not require power to retain stored information, is resistant to physical impact, and provides fast read access times. Due to these properties, the flash memory device is extensively used in battery powered devices.

Flash memory devices may be classified as a NOR flash memory device and a NAND flash memory device according to a logic gate used. Typically, flash memory devices store information on an array of transistors, called a cell. In a single level cell (SLC) flash memory, each cell stores 1 bit of data. Newer flash memory devices, called multi-level cell (MLC) flash memories, allow more than 1 bit to be stored in each cell, e.g., by changing an amount of electric charges on a floating gate of a cell.

FIG. 1 illustrates a block diagram of a typical NAND flash memory device. As illustrated in FIG. 1, the NAND flash memory device includes a memory cell array 10, a row selector (hereinafter, referred to as an x-selector) 20, and a data register and sense amplifier (S/A) 30. The memory cell array 10 includes a plurality of memory blocks MB0 to MB(m−1). Each of the memory blocks MB0 to MB(m−1) may store $2^N$-bit data (N is a positive integer equal to one or above). In response to a row address, the x-selector 20 selects one of the memory blocks MB0 to MB(m−1) and one of word lines in the selected memory block. The data register and S/A 30 is connected to the selected memory block through a bit line, and operates as a write driver while performing a program operation and as a sense amplifier while performing a read operation.

FIG. 2 illustrates a block diagram of a portion of a memory block MB0 in a flash memory and the data register and S/A 30. Referring to FIG. 2, the memory block MB0 may include strings 11 connected to a plurality of bit lines BLe0, BLo0, BLe1, BLo1, . . . , respectively. Each of the strings 11 may include a string select transistor SST, a ground select transistor GST, and memory cells MC31 to MC0 connected in series between the string select transistor SST and the ground select transistor GST. The string select transistors SST in the strings 11 may be commonly connected to the string select line SSL controlled by the x-selector 20 of FIG. 1. The ground select transistors GST in the strings 11 may be commonly connected to the ground select line GSL controlled by the x-selector 20 of FIG. 1. The memory cells MC31 to MC0 in each string 11 may be respectively connected to corresponding word lines WL31 to WL0 controlled by the x-selector 20 of FIG. 1. For convenient description, a pair of bit lines BLe0 and BLo0 is illustrated in FIG. 3. Remaining memory blocks MB1 to MB (m−1) substantially have the same structure as the memory block MB0 illustrated in FIG. 2, and their descriptions will be omitted for convenience.

The data register and S/A 30 may include a bit line selector 31 and a register 32 connected to the pair of bit lines BLe0 and BLo0. The bit line selector 31 may select one of the pair of bit lines BLe0 and BLo0, and may electrically connect the selected bit line with the register 32. During a program operation, the register 32 may supply the selected bit line with a program voltage (e.g., a ground voltage) or a program prohibit voltage (e.g., a power voltage) according to program data. During a read operation, the register 32 may detect data from a memory cell that is selected through a bit line. Although not illustrated in FIG. 2, the remaining pairs of bit lines are respectively connected to corresponding registers with the same structure like FIG. 2.

As illustrated above, flash memories may be erased and programmed in large blocks. Assuming that one word line includes two pages (an even page and an odd page), each of the memory cells stores 2 bit data, and one memory block includes 32 word lines, one memory block includes 128 pages (32WL*2P*2B). Here, WL, P, and B represent a word line, a page, and a bit, respectively.

A row address includes a block address for selecting memory blocks and a page address for selecting pages in the selected memory block. For example, a 7 bit address (hereinafter, referred to as a first row address) may be used to select 128 pages. A 10 bit address (hereinafter, referred to as a second row address) may be used to select 1024 memory blocks. Address coding is used to select all pages in one memory block, and then pages in the memory block.

For example, as illustrated in FIG. 3A, a 7 bit address A12 to A18 is used to select 128 pages at each memory block, and a plurality of address bits A19 to Ai are used to select memory blocks. The number of address bits to select the memory blocks is determined according to the number of the memory blocks. When the 7 bit address is 0000000, the first page 0P in the selected memory block is selected. When the 7 bit address is 1111111, the last page 127P in the selected memory block is selected. Thus, an external address provided may be mapped to a physical address of the flash memory device.

However, a problem may arise when storing 3-bit ($2^N+1$-bit) data at each cell instead of storing 2 bit ($2^N$-bit) data at each cell. When storing the 3-bit data at each cell, since 32 word lines, and odd and even bit lines are provided, one memory block includes 192 pages (32WL*2P*3B).

When storing the 3-bit data at each cell, as illustrated in FIG. 3B, since one memory block includes 192 pages, the memory block may not be uniquely divided into a page address and a block address. An 8-bit address is required to select 192 pages. However, 256 pages can be substantially selected by an 8-bit address. For that reason, there are pages that are selected by the 8-bit address, but are not substantially allocated to each memory block.

This problem may be illustrated by comparing FIGS. 3A and 3B. When the flash memory device stores 2-bit data at each cell, as illustrated in FIG. 3A, a page address selecting the first/last pages of the first memory block BLK0 is identical to a page address for selecting the first/last page of a second or another memory block. In contrast, when the flash memory device stores 3-bit data at each cell, as illustrated in FIG. 3B, a page address selecting the first/last pages of the first memory block BLK0 is different from a page address for selecting the first/last page of a second or another memory block. This means that a row address does not convert into a page address and a block address of a flash memory device. That is, when storing 3-bit data at each cell, a block address mapped into memory blocks may not be distinguishable from a page address. Thus, a memory controller controlling a flash memory device may require an address conversion table for converting a row address into a block address and a page address of the flash memory device illustrated in FIG. 3B.

SUMMARY OF THE INVENTION

Embodiments are therefore directed to a multi-bit flash memory device, a memory system including the same, and associated methods, which substantially overcome one or more of the problems due to the limitations and disadvantages of the related art.

It is therefore a feature of an embodiment to provide a multi-bit flash memory device, a memory system including the same, and associated methods, that does not use an address conversion table.

It is therefore another feature of an embodiment to provide a multi-bit flash memory device that selects a page to be accessed using a pointer, a memory system including the same, and associated methods.

At least one of the above and other advantages may be realized by providing memory systems including a multi-bit flash memory device and a flash controller controlling the multi-bit flash memory device. The flash controller may be configured to output a series of commands, pointers, and addresses to the multi-bit flash memory device for read/program operations.

In some embodiments, the pointer may be used to select one of read/program sequences of the multi-bit flash memory device. In other embodiments, the pointer may be used to perform read/program operations on one of a plurality of data bits stored in each memory cell. In still other embodiments, the multi-bit flash memory device may select one of word lines in response to the address and may select one of pages in the selected word line in response to the pointer. In even other embodiments, the multi-bit flash memory device may select one of planes of rows in the multi-bit flash memory device in response to the pointer.

In yet other embodiments, the pointer may be transmitted before or after transmitting the command, which is transmitted before transmitting the address. In still further embodiments, the command and the pointer may be transmitted as one command.

In even further embodiments, the multi-bit flash memory device may store ($2^N$+1)-bit data (N is a positive integer equal to one or above). In yet further embodiments, the multi-bit flash memory device may store $2^N$-bit data (N is a positive integer equal to one or above).

In yet further embodiments, the multi-bit flash memory device may be one of a NAND flash memory device, a NOR flash memory device, PRAM, FRAM, and MRAM.

In yet further embodiments, the multi-bit flash memory device and the flash controller may constitute one of a flash memory card and a smart card.

In yet further embodiments, the flash controller may be directly connected to a main board of a computing system. In yet further embodiments, the flash controller may be connected to the multi-bit flash memory device through a standardized interface such as ATA, SATA, USB, SCSI, ESDI, ISO, PCI, and IDE.

In yet further embodiments, the multi-bit flash memory device may include a memory cell array including memory cells arranged in rows and columns, a read/program circuit configured to perform read and program operations on the memory cell array, and a control block configured to control the read/program circuit in response to the pointer.

In yet further embodiments, the control block may select one of pages in the selected row in response to the pointer and may control the read/program circuit to perform the read/program operations on the selected page. In yet further embodiments, the control block may select one of pages in the selected row in response to the pointer and may control the read/program circuit to perform read/program operations according to a read/program sequence corresponding to the selected page. In yet further embodiments, the rows may be divided into a plurality of planes, and the control block may select one of planes of the rows in response to the pointer. In yet further embodiments, the memory cell may include a string structure.

At least one of the above and other advantages may be realized by providing multi-bit flash memory devices including a memory cell array including memory cells arranged in rows and columns, a read/program circuit configured to select a row in response to an address provided from the external and performs read/program operations on memory cells of the selected row, and a control block configured to control the read/program circuit in response to a pointer and a command from the external. The control block may be configured to select one of pages in the selected row in response to the pointer, and controls the read/program circuit to perform read/program operations according to a read/program sequence corresponding to the selected page.

In some embodiments, the pointer may be transmitted after or before transmitting the command, which is transmitted before transmitting the address. In still other embodiments, the command and the pointer may be transmitted as one command.

In even other embodiments, the multi-bit flash memory device may store ($2^N$+1)-bit data (N is a positive integer equal to one or above). In yet other embodiments, the multi-bit flash memory device may store $2^N$-bit data (N is a positive integer equal to one or above).

In further embodiments, the multi-bit flash memory device may be one of a NAND flash memory device, a NOR flash memory device, PRAM, FRAM, and MRAM.

At least one of the above and other advantages may be realized by providing methods of operating a multi-bit flash memory device and a memory system including the same, the method including generating a series of commands, pointers, and addresses for read/program operations, and performing the read/program operations in the multi-bit flash memory device in response to the series of commands, pointers, and addresses.

In some embodiments, performing may include using the pointer to select one of read/program sequences of the multi-bit flash memory device. In other embodiments, performing may include using the pointer to perform the read/program operations on one of a plurality of data bits stored in each memory cell of the multi-bit flash memory device.

In still other embodiments, performing may include the multi-bit flash memory device selecting one of word lines in response to the address and one of pages in the selected word line in response to the pointer. In even other embodiments, performing may include the multi-bit flash memory device selecting one of planes of rows in the multi-bit flash memory device in response to the pointer.

In yet other embodiments, the method may include transmitting the pointer to the multi-bit flash memory device before or after transmitting the command, which is transmitted before transmitting the address. In still further embodiments, the command and the pointer may be transmitted as one command.

In even further embodiments, the multi-bit flash memory device may store ($2^N$+1)-bit data (N is a positive integer equal to one or above).

In yet further embodiments, the multi-bit flash memory device may store 2-bit data (N is a positive integer equal to one or above).

BRIEF DESCRIPTION OF THE DRAWINGS

The above and other features and advantages of embodiments will become more apparent to those of ordinary skill in the art by describing in detail exemplary embodiments thereof with reference to the attached drawings, in which:

FIG. 3B illustrates block and page addresses of a flash memory device storing 3-bit data at each cell;

FIG. 6 illustrates a block diagram of a flash memory device of FIG. 4.

DETAILED DESCRIPTION OF THE INVENTION

Korean Patent Application No. 10-2007-0002598, filed on Jan. 9, 2007, in the Korean Intellectual Property Office, and entitled: "Memory System, Multi-Bit Flash Memory Device, and Method of Operating Multi-Bit Flash Memory Device and Memory System Including the Same," is incorporated by reference herein in its entirety.

A flash memory device is used as one example of non-volatile memory devices in order to illustrate properties and functions of the embodiments. Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 4:
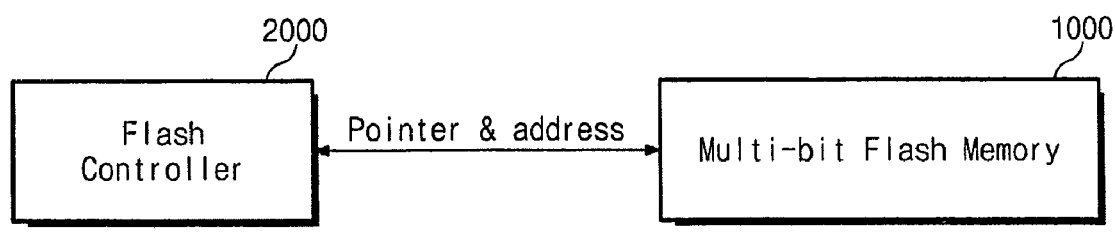
FIG. 4 illustrates a block diagram of a memory system according to an embodiment of the present invention.

FIG. 4 illustrates a block diagram of a memory system according to an embodiment. Referring to FIG. 4, the memory system may include a multi-bit flash memory device 1000 and a flash controller (which is also called a memory controller) 2000. For example, the memory system may be applicable to memory cards, buffer memories of hard disks, high capacity memories of computing systems, etc. However, it will be apparent to those in the art that the present invention is not limited to those.

The multi-bit flash memory device 1000 may be a flash memory device storing $2^N+1$-bit data (N is a positive integer equal to or greater than one). However, it will be apparent to those skilled in the art that the multi-bit flash memory device 1000 may be a flash memory device storing $2^N$-bit data.

The flash controller 2000 may control access to the multi-bit flash memory device 1000. In particular, the flash controller 2000 may provide a pointer to the multi-bit flash memory device 1000 before transmitting an address for selecting a row line or a word line. The pointer may represent which one of a plurality of data bits in each memory cell is to be accessed. That is, the pointer may represent which page in an arbitrary row is to be accessed.

For example, assume that each memory cell stores 3-bit data. For convenience, a lowest bit, a middle bit, and a highest bit are referred to as a first data bit, a second data bit, and a third data bit, respectively. When a pointer has a value of 00h, the multi-bit flash memory device 1000 may perform read/program operations on the first data bit. When the pointer has a value of 01h, the multi-bit flash memory device 1000 may perform read/program operations on the second data bit. When the pointer has a value of 10h, the multi-bit flash memory device 1000 may perform read/program operations on the third data bit. By selecting a data bit using a pointer instead of an address, problems with the conventional devices may be resolved. In other words, the ambiguity between block and page addresses may be resolved by using a pointer to designate the page at each row instead of using a page address.

Figure 5:
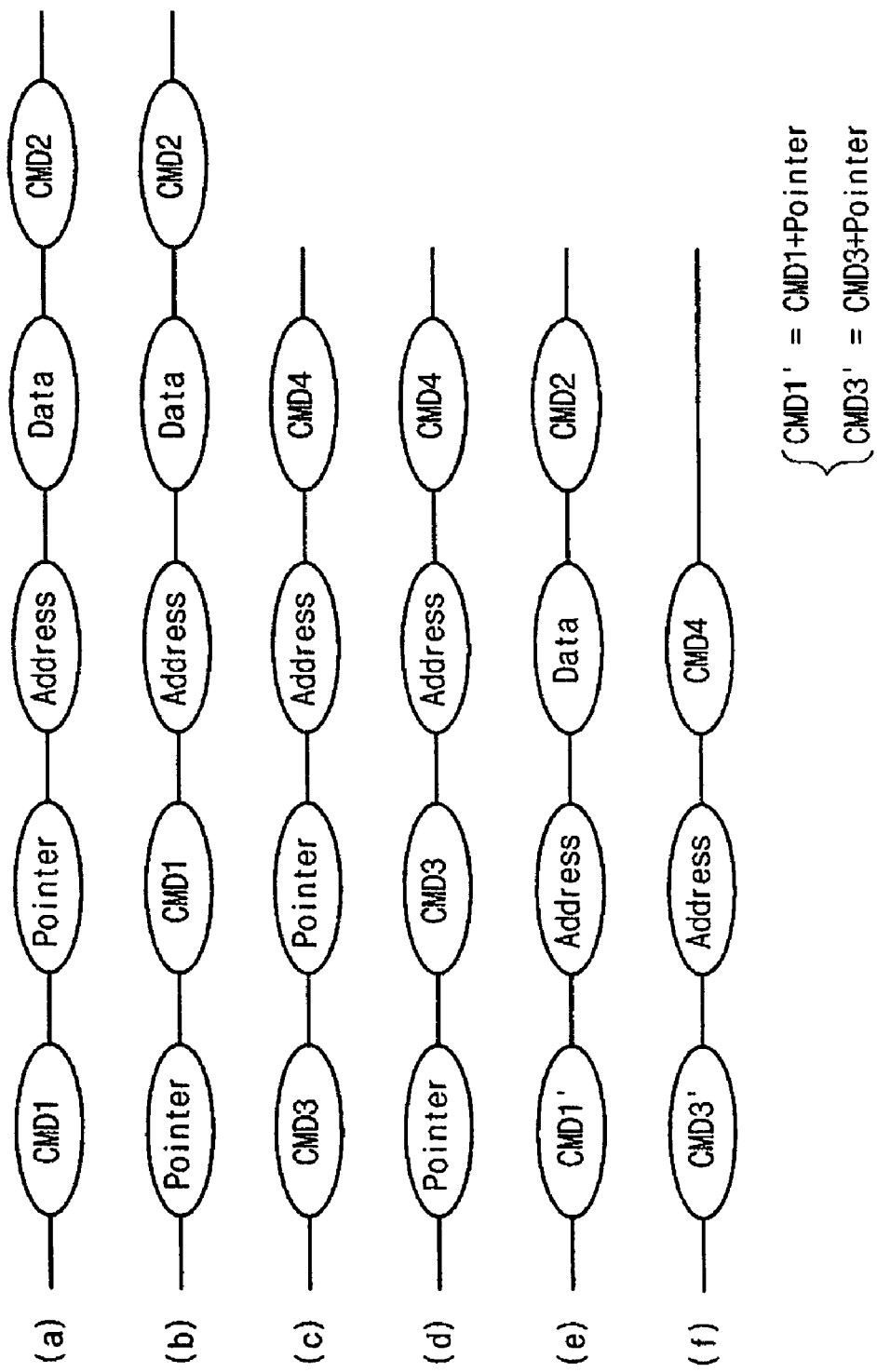
FIG. 5 illustrates an interface method between a memory controller and a flash memory device in FIG. 4.

The pointer may be provided to the flash memory device 1000 before the address for selecting a row is provided. For example, as illustrated in FIG. 5, in addition to the pointer, the flash controller 2000 may provide a first command CMD1, an address ADD, data DATA, and a second command CMD2 according to timing for a program operation. Additionally, the flash controller may provide the pointer, a third command CMD3, the address ADD, and a fourth command CMD4 according to timing for a read operation. In FIG. 5, (a) to (f) illustrate examples of transmission orders from the flash controller 2000.

As illustrated in (a) in FIG. 5, the first command CMD1 may be transmitted from the flash controller 2000 to the multi-bit flash memory device 1000, followed by the pointer, the address ADD, the data DATA, and the second command CMD2. As illustrated in (b) in FIG. 5, the pointer may be transmitted from the flash controller 2000 to the multi-bit flash memory device 1000, followed by the first command CMD1, the address ADD, the data DATA, and the second command CMD2.

As illustrated in (c) in FIG. 5, the third command CMD3 may be transmitted from the flash controller 2000 to the multi-bit flash memory device 1000, followed by the pointer, the address ADD, and the fourth command CMD4. As illustrated in (d) in FIG. 5, the pointer may be transmitted from the flash controller 2000 to the multi-bit flash memory device 1000, followed by the third command CMD3, the address ADD, and the fourth command CMD4.

A new command including the pointer may also be defined. For example, as illustrated in (e) FIG. 5, the flash controller 2000 may transmit a command CMD1' (including the CMD1 and the pointer) to the multi-bit flash memory device 1000 for a program operation, before transmitting the address ADD, the data DATA, and the second command CMD2. As illustrated in (f) in FIG. 5, the flash controller 2000 may transmit a command CMD3' (including the CMD3 and the pointer) to the multi-bit flash memory device 1000 for a read operation, before transmitting the address ADD and the fourth command CMD4.

According to an embodiment, when storing a 3-bit data at each cell, although one memory block includes 192 pages, differentiable page addresses (or word line addresses) and block addresses may be provided, as in a multi-bit flash memory device storing 2-bit data. One of pages ($2^N+1$ pages) in the selected word line may be selected by one pointer. In the case of the multi-bit flash memory device storing a $2^N+1$ data at each cell, a block address may be distinguishable from a page address. Due to this, the memory controller controlling the flash memory device according to an embodiment does not require an address conversion table in order to convert row addresses into block and page addresses of the flash memory device.

In embodiments, the pointer may be transmitted according to an interface protocol of the NAND flash memory device, but it will be apparent to those skilled in the art that this interface protocol is also applicable to interface protocols of a NOR flash memory device, a phase change memory device, e.g., a PRAM, a magnetoresistive memory device, e.g., an MRAM, a ferroelectric memory device, e.g., a FRAM, etc.

FIG. 6 illustrates a block diagram of a flash memory device of FIG. 4 according to an embodiment. The multi-bit flash memory device 1000 according to the embodiment of the present invention may include a NAND flash memory device. However, it will be apparent to those skilled in the art that the present invention also be applicable to a multi bit NOR flash memory device, multi-bit PRAM, multi-bit MRAM, multi-bit FRAM, etc.

Referring to FIG. 6, the multi-bit flash memory device 1000 of the present invention may include a memory cell array 1100, a row decoder circuit (X-DEC) 1200, a column decoder circuit (Y-DEC) 1300, a data register and S/A 1400, a column gate circuit 1500, an input/output interface 1600, and a command register and control logic 1700.

Figure 1:
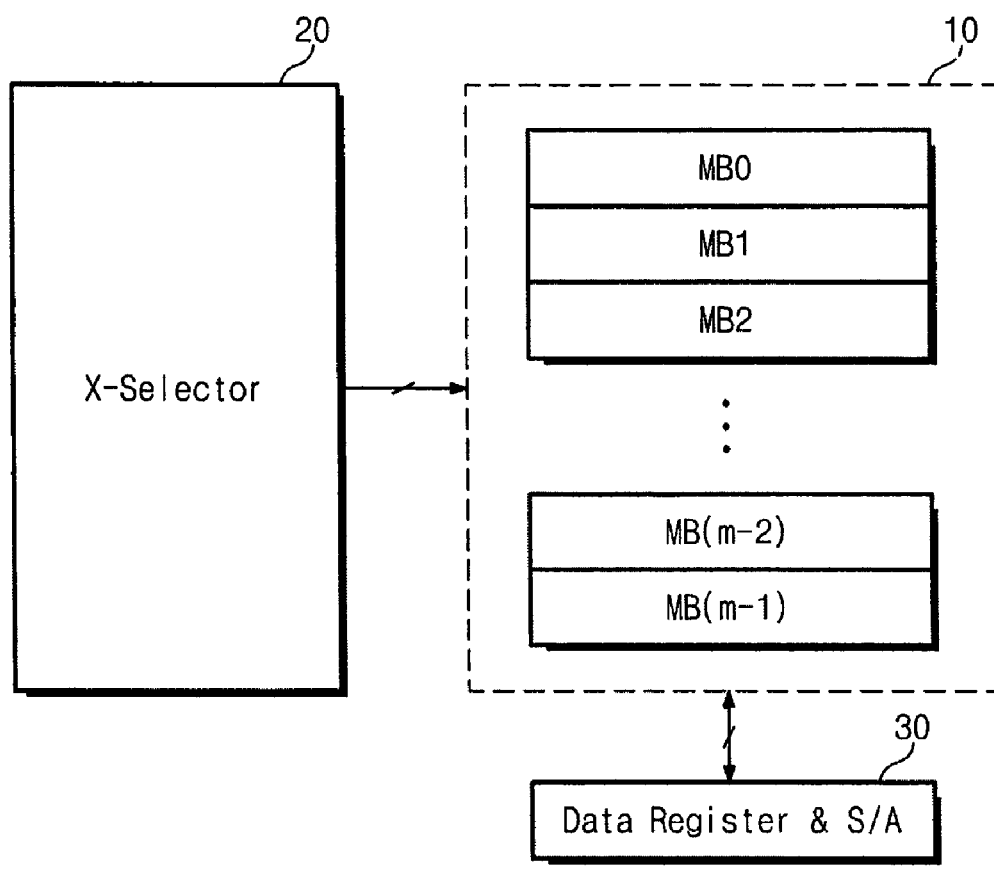
FIG. 1 illustrates a block diagram of a typical NAND flash memory device.
Figure 2:
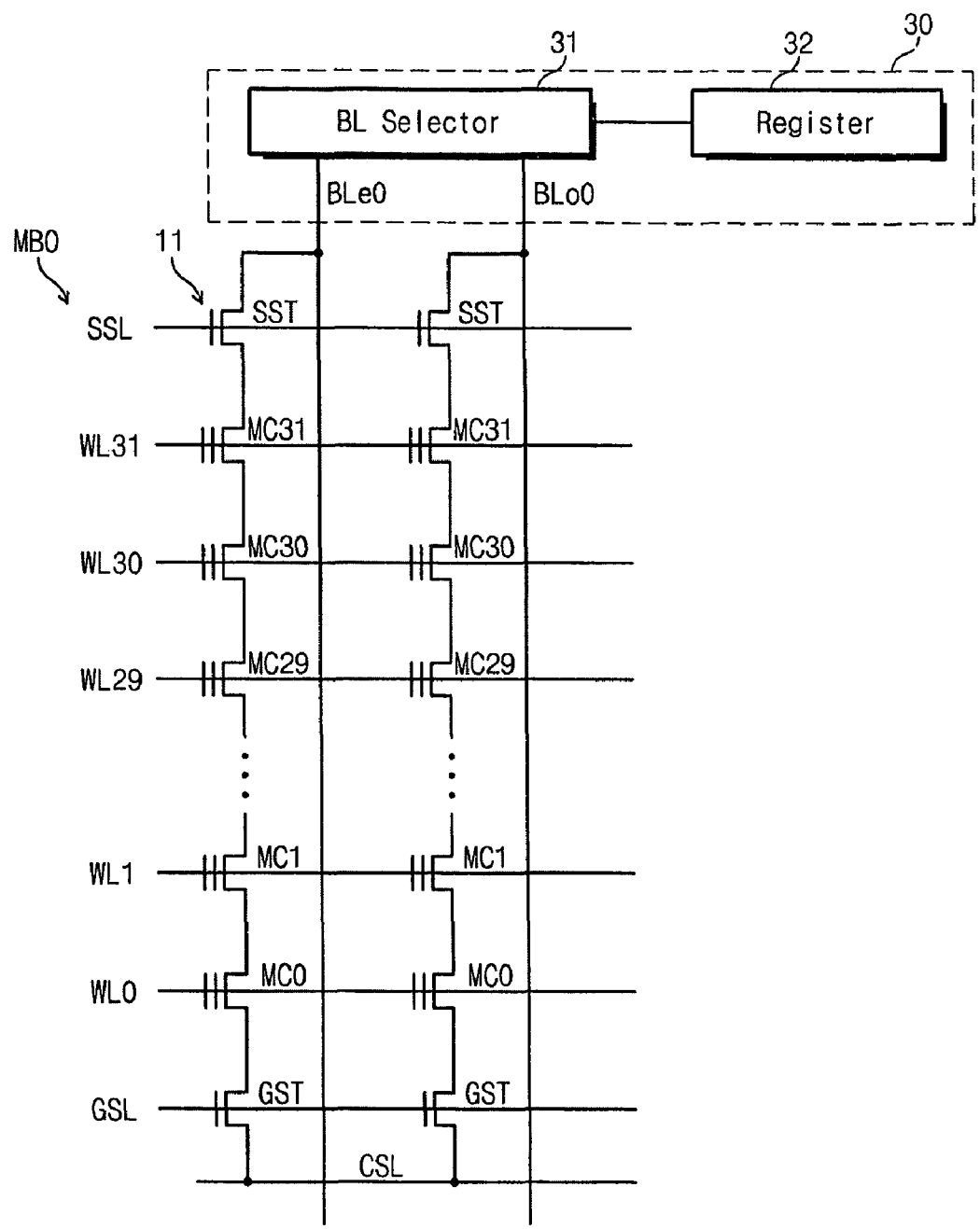
FIG. 2 illustrates a block diagram of a portion of a memory block of FIG. 1 and a corresponding data register and S/A.
Figure 3A:
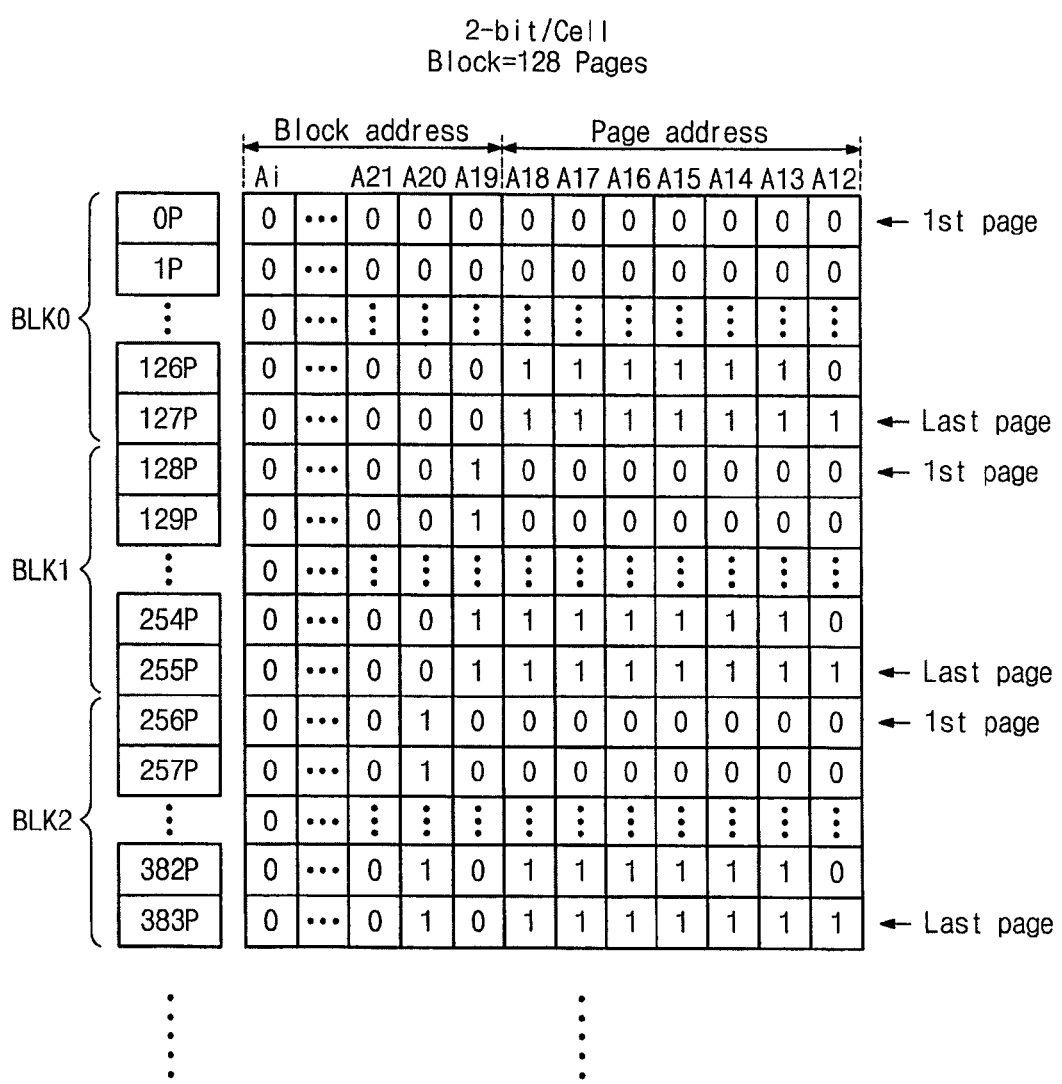
FIG. 3A illustrates block and page addresses of a flash memory device storing 2-bit data at each cell.

The memory cell array 1100 may include a plurality of memory blocks. Each memory block may include memory cells arranged in row or word lines and columns or bit lines. A structure of the memory block may be identical to that of FIG. 2, and description thereof is omitted for conciseness. The row decoder circuit 1200 may select pages of the memory cell array 1100 in response to a row address RA provided through the input/output interface 1600. The column decoder circuit 1300 may decode a column address CA provided through the input/output interface 1600, and then may output the decoded result to the column gate circuit 1500 as column select information. The data register and sense amplifier (S/A) 1400 may operate as a sense amplifier during a read operation and may operate as a write driver during a program operation. The data register and S/A 1400 may have a structure identical to that of FIG. 2.

The command register and control logic 1700 may receive a command through the input/output interface 1600 in response to a control signal, and may control components of the flash memory device 1000 according to the input command. In particular, the command register and control logic 1700 may receive a pointer through the input/output interface 1600.

The pointer, as described above, may be used for performing read/program operations on one of the data bits in a memory cell. As well known, a read/program sequence (or, an algorithm) may differ according to the data bits of the memory cell. For example, according to whether access is requested to one of the data bits in the memory cell, read and program voltages, and the order of read/program operations will be set differently. The read/program sequence (or, an algorithm) with respect to respective data bits in the memory cell is selected by the input pointer. Next, the requested read/program operations on one of the data bits is performed under the control of the command register and control logic 1700 according to the read/program sequence selected by the pointer.

According to this embodiment, the row decoder circuit 1200, the column decoder circuit 1300, the data register and S/A 1400, and the column gate circuit 1500 constitute a read/program circuit performing read/program operations on selected memory cells. The command register and control logic 1700 constitutes a control block controlling the read/program circuit.

It will be apparent to those skilled in the art that the pointer may be diversely used. For example, when selecting rows by a plurality of planes, a pointer can be used to select the planes, instead of an address. Typically, the number of address bits increases as the number of data bits stored in the memory cell increases. This may increase the number of input/output pins. However, the number of input/output pins may not increase when using a pointer in accordance with an embodiment.

In embodiments of the present invention, the multi-bit flash memory device and the flash controller may constitute a flash memory card or a smart card. Furthermore, the flash controller may be directly installed to a main board of a computing system, e.g., a personal computer. In this case, the flash controller may be connected to the multi-bit flash memory device through a standardized interface, e.g., advanced technology attachment (ATA), serial ATA (SATA), universal serial bus (USB), small computer system interface (SCSI), enhance small device interface (ESDI), international organization for standardization (ISO) interface, peripheral component interconnect (PCI), integrated drive electronics (IDE), and so forth.

As described above, by selecting one of data bits in a memory cell using a pointer, even when storing $2^N+1$ data in a cell, page addresses and block addresses may be distinguishable.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A memory system comprising:
   a multi-bit flash memory device; and
   a flash controller configured to control the multi-bit flash memory device,
   wherein the flash controller is configured to output a series of commands, pointers, and addresses to the multi-bit flash memory device for read/program operations and further wherein the multi-bit flash memory device comprises:
   a memory cell array including memory cells arranged in rows and columns;
   a read/program circuit configured to perform read and program operations on the memory cell array; and
   a control block configured to control the read/program circuit in response to the pointer.

2. The memory system as claimed in claim 1, wherein the multi-bit flash memory device selects one of read/program sequences of the multi-bit flash memory device in response to the pointer.

3. The memory system as claimed in claim 1, wherein the multi-bit flash memory device performs read/program operations on data bits stored in a memory cell in response to the pointer.

4. The memory system as claimed in claim 1, wherein the multi-bit flash memory device selects a word line in response to the address and selects a page in the selected word line in response to the pointer.

5. The memory system as claimed in claim 1, wherein the multi-bit flash memory device selects a plane of rows in the multi-bit flash memory device in response to the pointer.

6. The memory system as claimed in claim 1, wherein the pointer is output before the address.

7. The memory system as claimed in claim 1, wherein the command and the pointer are output in one command.

8. The memory system as claimed in claim 1, wherein the multi-bit flash memory device stores ($2^N+1$)-bit data (N is a positive integer equal to one or above) or $2^N$-bit data.

9. The memory system as claimed in claim 1, wherein the multi-bit flash memory device is one of a NAND flash memory device, a NOR flash memory device, a phase change memory device, a ferroelectric memory device, and a magnetoresistive memory device.

10. The memory system as claimed in claim 1, wherein the multi-bit flash memory device and the flash controller constitute one of a flash memory card and a smart card.

11. The memory system as claimed in claim 1, wherein the flash controller is directly connected to a main board of a computing system.

12. The memory system as claimed in claim 11, wherein the flash controller is connected to the multi-bit flash memory device through a standardized interface.

13. A multi-bit flash memory device, comprising:
a memory cell array including memory cells arranged in rows and columns;
a read/program circuit configured to select a row in response to a row address and perform read/program operations on memory cells of the selected row; and
a control block configured to control the read/program circuit in response to a pointer and a command input to the multi-bit flash memory device,
wherein the control block is configured to select a page in the selected row in response to the pointer, and control the read/program circuit to perform read/program operations according to a read/program sequence corresponding to the selected page.

14. The multi-bit flash memory device as claimed in claim 13, wherein the control block receives the pointer and the command sequentially.

15. The multi-bit flash memory device as claimed in claim 13, wherein the control block receives the command and the pointer as one command.

16. The multi-bit flash memory device as claimed in claim 13, wherein the multi-bit flash memory device stores ($2^N+1$)-bit data (N is a positive integer equal to one or above) or $2^N$-bit data.

17. The multi-bit flash memory system as claimed in claim 13, wherein the multi-bit flash memory device is one of a NAND flash memory device, a NOR flash memory device, a phase change memory device, a ferroelectric memory device, and a magnetoresistive memory device.

18. A method of operating a multi-bit flash memory device and a memory system including the same, the method comprising:
generating a series of commands, pointers, and addresses for read/program operations; and
performing the read/program operations in the multi-bit flash memory device in response to the series of commands, pointers, and addresses wherein performing includes selecting one of read/program sequences of the multi-bit flash memory device in response to the pointer.

19. The method as claimed in claim 18, wherein performing includes performing the read/program operations on data bits stored in a memory cell of the multi-bit flash memory device in response to the pointer.

20. The method as claimed in claim 18, wherein performing includes:
selecting a word line in response to the address; and
selecting a page in the selected word line in response to the pointer.

21. The method as claimed in claim 18, wherein performing includes selecting a plane of rows in the multi-bit flash memory device in response to the pointer.

22. The method as claimed in claim 18, further comprising transmitting the pointer to the multi-bit flash memory device before the address.

23. The method as claimed in claim 18, further comprising transmitting the pointer and the command as one command.

24. The method as claimed in claim 18, wherein herein performing includes storing ($2^N+1$)-bit data (N is a positive integer equal to or greater than one) or $2^N$-bit data.

* * * * *